United States Patent [19]

Fujita et al.

[11] Patent Number: 5,703,184
[45] Date of Patent: Dec. 30, 1997

[54] PROCESS FOR PRODUCING STYRENIC POLYMER

[75] Inventors: Masayuki Fujita, Ichihara; Takahiro Ishii, Sodegaura, both of Japan

[73] Assignee: Sumitomo Chemical Company, Limited, Osaka, Japan

[21] Appl. No.: 624,989

[22] Filed: Mar. 29, 1996

[30] Foreign Application Priority Data

Mar. 31, 1995 [JP] Japan ................................ 7-075624

[51] Int. Cl.$^6$ ................................................ C08F 112/08
[52] U.S. Cl. ...................... 526/220; 526/205; 526/222; 526/223; 526/218.1; 526/346
[58] Field of Search ........................ 526/205, 220, 526/222, 223, 218.1, 346

[56] References Cited

U.S. PATENT DOCUMENTS

| 2,813,849 | 11/1957 | Kern .................................. 526/220 X |
| 4,956,433 | 9/1990 | Mezger . | |

FOREIGN PATENT DOCUMENTS

| 55164207 | 12/1980 | Japan . | |
| 86-087237/13 | 9/1985 | Japan . | |
| 0219204 | 11/1985 | Japan ................................ 526/205 |
| 86-103399/16 | 3/1986 | Japan . | |
| 60001247 | 1/1987 | Japan . | |
| 1475449 | 2/1975 | United Kingdom . | |

OTHER PUBLICATIONS

Takayuki Otsu et al., Makromol. Chem., Rapid Commun., Role of Initiator-Transfer Agent-Terminator . . . . 3, pp. 127-132 (1982).
Takayuki Otsu et al., Polymer Bulletin, Living Radical Polymerizations . . . , 7, pp. 45-50 (1982).

*Primary Examiner*—Fred Teskin
*Attorney, Agent, or Firm*—Birch, Stewart, Kolasch & Birch, LLP

[57] ABSTRACT

A process for producing a styrenic polymer having a wide-spread molecular weight distribution, which comprises polymerizing a styrenic monomer or a styrenic monomer and a monomer copolymerizable with the styrenic monomer in the presence of 50 to 5000 ppm by weight of at least one compound selected from compounds having a dithiocarbamate group and sulfide compounds having at least one of an aryl group, an arylalkyl group and a thiazole group based on the total monomer to a final conversion of 40% by weight or more in the absence or presence of a radical initiator subjecting to a suspension polymerization, a batchwise bulk polymerization or a continuous bulk polymerization using a plug flow type polymerization reactor. According to the present invention, there can be provided a simplified process for preparing a styrenic polymer having a wide-spread molecular weight distribution.

15 Claims, 1 Drawing Sheet

PROCESS FOR PRODUCING STYRENIC POLYMER

FIELD OF THE INVENTION

The present invention relates to a process for producing a styrenic polymer. Particularly, the present invention is relates to a method for producing a styrenic polymer having a wide molecular weight distribution, in one step.

BACKGROUND OF THE INVENTION

A styrenic polymer is widely used for molding because it has a rigidity, a superior dimension stability and a low price. Recently, It has been demanded in a field for injection molding that a time required for the so-called molding cycle such as a melting, injecting, dwelling and cooling is shortened to increase a molding efficiency. In order to shorten the molding cycle, it is necessary that it has a high flowability at injecting and is solidified at high temperature at cooling, in other word, is difficult to be softened at high temperature, namely, is superior in heat resistance.

As a trial to meet with these demands, a method decreasing the molecular weight of polymer to increase the flowability of a styrenic polymer is proposed. However, this method had a problem that a strength of the polymer decreased and therefore, a crack was generated at ejecting a molded article from a mold and at using a molded article. As a method increasing a flowability without decreasing the molecular weight of a polymer, for example, there is a method adding a plasticizer such as a mineral oil and the like. However, this method had a problem that the heat resistance and impact strength of the polymer decreased. As a method keeping a level satisfying the heat resistance and impact strength of the polymer and increasing a flowability, there are disclosed, in Japanese Examined Patent Publication Nos. Sho 57-30843 and Sho 62-61231, a method producing a polymer composition having a wide-spread molecular weight distribution by blending a high molecular weight polystyrene and a low molecular weight polystyrene or by using a multistage polymerization method. However, a multistage polymerization method had a undesirable problem that due to the necessity of at least two stages polymerization process, in detail, for example, first stage for preparing a high molecular weight polystyrene by bulk polymerization or solution polymerization at a low temperature, or polymerization with a multi-functional catalyst for low temperature and successive second stage for preparing a styrene polymer by proceeding a polymerization with a well-known method, this preparing process increases in production cost owing to complication of the process.

SUMMARY OF THE INVENTION

It is an object of the present invention is to provide a process for producing a styrenic polymer having an excellent flowability and an excellent heat resistance and having a wide-spread molecular weight distribution easily with one-stage polymerization process.

According to the present invention, there is provided a process for producing a styrenic polymer having a wide molecular weight distribution, which comprises adding 50 to 5000 ppm by weight of at least one compound(A) selected from the group consisting of compounds having a dithiocarbamate group, sulfide compounds having at least one of an aryl group, an arylalkyl group and a thiazole group to a styrenic monomer or a styrenic monomer and a monomer copolymerizable with the styrenic monomer, based on the total monomer, and polymerizing said monomer in the absence of a radical initiator at a temperature of 110° to 180° C. to a final conversion of 40% by weight or more, said polymerization being carried out by a suspension polymerization, batchwise bulk polymerization or continuous bulk polymerization using a plug flow type polymerization reactor.

Further, according to the present invention, there is provided a process for producing a styrenic polymer having a wide molecular weight distribution, which comprises adding 50 to 5000 ppm by weight of at least one compound(A) selected from the group consisting of compounds having a dithiocarbamate group, sulfide compounds having at least one of an aryl group, an arylalkyl group and a thiazole group to a styrenic monomer or a styrenic monomer and a monomer copolymerizable with the styrenic monomer, based on the total monomer, and polymerizing said monomer in the presence of a radical initiator at a temperature of 90° to 160° C. to a final conversion of 40% by weight or more, said polymerization being carried out by a suspension polymerization, batchwise bulk polymerization or continuous bulk polymerization using a plug flow type polymerization reactor.

Other objects and advantages of the present invention will be apparent from the description below.

DETAILED DESCRIPTION OF THE INVENTION

Figure 1:
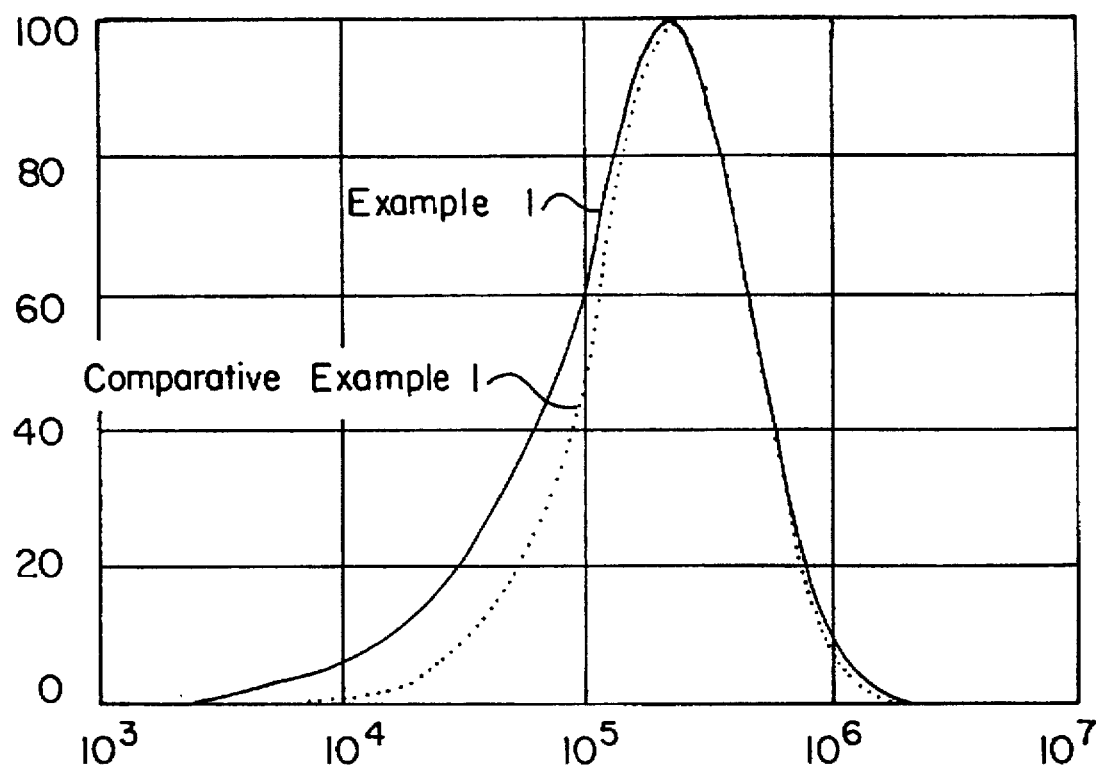
FIG. 1 shows the molecular weight distribution curves of the resins obtained in Example 1 and Comparative Example 1 described below.

A styrenic polymer having a wide molecular weight distribution in the present invention means one having a ratio of a weight average molecular weight (Mw) to a number average molecular weight (Mn) [Mw/Mn] of 2.5 or more and the upper limit is not restricted particularly. But, the ratio of 10 or less is preferred from a view point of keeping a mechanical strength.

As a styrenic monomer used in the present invention, there are exemplified styrene, an α-substituted alkyl styrene such as α-methyl styrene and the like, a nuclear-substituted alkylstyrene such as p-methylstyrene and the like.

In the present invention, a monomer copolymerizable with the styrenic monomer, for example, a vinyl monomer such as acrylonitrile, methacrylonitrile, methacrylic acid, methylmethacrylate and the like, maleic anhydride, maleimide, nuclear-substituted maleimide and the like may be used in combination with the styrenic monomer.

In the present invention, there is used at least one compound (A) selected from the group consisting of compounds having a dithiocarbamate group, and sulfide compounds having at least one of an aryl group and an arylalkyl group and a thiazole group. The aryl and arylalkyl groups have preferably 6 to 12 carbon atoms.

The examples of the compounds having a dithiocarbamate group include compounds represented by the following general formulae,

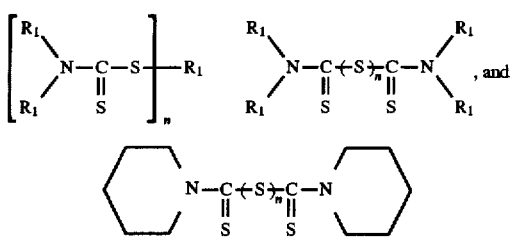

wherein $R_1$ represents an alkyl group having 1 to 4 carbon atoms or an aryl or arylalkyl group having 6 to 12 carbon atoms and may be the same or different in the same compound, and n represents an integer of 1 to 4.

The examples of the sulfide compounds having at least one of an aryl and arylalkyl group having 6 to 12 carbon atoms and thiazole group used in the present invention include compounds represented by the following general formulae,

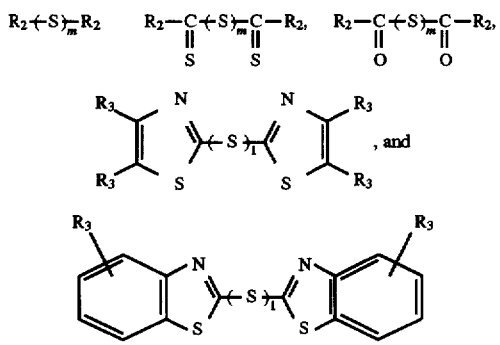

wherein $R_2$ represents an aryl or arylalkyl group having 6 to 12 carbon atoms and may be the same or different in the same compound, $R_3$ represents a hydrogen atom, an alkyl group having 1 to 4 carbon atoms, or an aryl or arylalkyl group having 6 to 12 carbon atoms and may be the same or different in the same compound, and each m and l represents an integer of 1 to 4.

Furthermore, concrete examples of the compounds represented by the above-mentioned general formulae include tetramethylthiurammonosulfide, tetramethylthiuram disulfide, tetramethylthiuram tetrasulfide, tetraethylthiuram monosulfide, tetraethylthiuram disulfide, tetraethylthiuram tetrasulfide, tetrabutylthiuram disulfide, tetrabutylthiuram, tetrasulfide, dipentamethylenethiuram disulfide, dipentamethylenethiuram tetrasulfide, 1,2,4,5-tetrakis(N,N-dimethyldithiocarbamylmethyl)benzene, 1,2,4,5-tetrakis (N,N-diethyldithiocarbamylmethyl)benzene, benzyl-N,N-dimethyldithiocarbamate, benzyl-N,N-diethyldithiocarbamate, 4-vinylbenzyl-N,N-dimethyldithiocarbamate, 4-vinylbenzyl-N,N-diethyldithiocarbamate, 2-phenylethyl-dimethyldithiocarbamate, para-xylylene-N,N-diethyldithiocarbamate, diphenyl disulfide, dibenzyl disulfide, dibenzoyl disulfide, benzothiazoyl disulfide and the like. Among these, tetramethylthiuram monosulfide, tetramethylthiuram disulfide, tetraethylthiuram disulfide, tetrabutylthiuram disulfide, dipentamethylenethiuram tetrasulfide, 1,2,4,5-tetrakis(N,N-diethyldithiocarbamylmethyl)benzene, benzyl-N,N-dimethyldithiocarbamate, benzyl-N,N-diethyldithiocarbamate, 4-vinylbenzyl-N,N-diethyldithiocarbamate, para-xylylene-N,N-diethyldithiocarbamate, diphenyl disulfide, dibenzoyl disulfide, benzothiazoyl disulfide and the like are preferred.

An added amount of the compound (A) described above is within the range of 50 to 5000 ppm by weight and preferably 50 to 4000 ppm by weight based on the total monomer. When the amount of the compound (A) is less than 50 ppm by weight, the molecular weight distribution is not broadened, and therefore, a flowability is not increased. When it exceeds 5000 ppm by weight, the molecular weight becomes low, an adequate mechanical strength cannot be obtained.

As the process for producing the styrenic polymer of the present invention, a suspension polymerization, a batchwise bulk polymerization, or a continuous bulk polymerization using a plug flow type polymerization reactor is adopted. As the plug flow type reactor, for example, a plug flow type flooded (vertical or horizontal) polymerization vessel or a static mixer tube type polymerization vessel can be used.

In the present invention, the polymerization can be carried out in the presence or the absence of a radical initiator.

When the radical initiator is not used in the present invention, the polymerization is preferably carried out at a temperature of 110° to 180° C. and, preferably 120° to 160° C.

As the molecular weight distribution is not broadened at the polymerization temperature of less than 110° C., a flowability is not increased and as the molecular weight becomes small at more than 180° C., an adequate mechanical strength cannot be obtained.

When a radical initiator is used, the polymerization is preferably carried out at a temperature of 90° to 160° C. and preferably 100° to 150° C. As a radical initiator used in the present invention, any radical initiators such as organic peroxides, azo compounds and the like used in a conventional radical polymerization of a styrene and the like can be used, and organic peroxides are preferred.

Usually, the radical initiator of 50 to 5000 ppm by weight, preferably 100 to 5000 ppm by weight based on the total monomer is added to the monomer.

As the molecular weight distribution is not broadened at the polymerization temperature of less than 90° C., a flowability is not increased and as the molecular weight becomes low at more than 160° C., an adequate mechanical strength cannot be obtained.

The polymerization is carried out to a final conversion of 40% by weight or more, preferably 60% by weight or more and more preferably 70% by weight or more. When the final conversion is less than 40% by weight, a production efficiency is inferior and not suitable for industry.

In the present process, if necessary, there may be added a lubricant, an antistatic agent, an anti-oxidant, a thermal stabilizer, an ultra violet absorbent, a pigment, a dyestuff, a plasticizer such as a mineral oil and the like to the styrenic monomer.

EXAMPLE

The present invention is illustrated in detail according to the Examples as follows but the present invention is not limited thereto.

The measurement methods used in Examples and Comparative Examples are illustrated as follows.

(1) The molecular weight distribution, the weight average molecular weight and the number average molecular weight A solution wherein a sample was dissolved in tetrahydrofuran solvent to be a concentration of 0.5 mg/ml was measured with a gel permeation chromatography (GPC). GPC was equipped with a differential refractometer as a detector and the weight average molecular weight (Mw), the number average molecular weight (Mn) and the molecular weight distribution were calculated by a calibration curve determined from a monodisperse polystyrene.

EXAMPLES 1 TO 2 AND COMPARATIVE EXAMPLES 1 TO 3

Tetraethylthiuram disulfide (manufactured by Sumitomo Chemical Company, Ltd.) was used. A solution prepared according to the composition shown in Table 1 was polymerized at the polymerization temperature to the final conversion shown in Table 1, subjecting to a batchwise bulk polymerization. The molecular weight distribution curves and the average molecular weight of thus obtained polymer were determined and shown in Table 1 and FIG. 1, respectively.

EXAMPLES 3 TO 5

Each was performed in like manner as Example 1 except that the compound shown in Table 2 was used, a solution mixed according to the composition shown in Table 2 was polymerized at the polymerization temperature shown in Table 2. The result is shown in Table 2.

EXAMPLE 6 AND COMPARATIVE EXAMPLE 4

In an autoclave with an inner volume of 20 liter were charged 8 kg of water, 8 kg of styrene, and 0.128 kg (0.8% by weight) of sodium phosphate and 0.16 kg (0.001% by weight) of sodium dodecylbenzenesulfonate as a dispersing agent. The organic peroxide and tetraethylthiuram disulfide (manufactured by Sumitomo Chemical Company, Ltd.) shown in Table 3 ware used and suspension polymerization was performed at the polymerization temperature shown in Table 3 to obtain polystyrene beads. Next, after the beads ware washed, dehydrated and dried, they ware pelletized with a 40 mmφ extruder at 210° C. The average molecular weight of the pelletized resin was determined and shown in Table 3.

TABLE 1

|  | Examples | | Composition Comparative Examples | | |
|---|---|---|---|---|---|
|  | 1 | 2 | 1 | 2 | 3 |
| Monomer Styrene % by weight | 100 | 100 | 100 | 100 | 100 |
| Compound (A) X1 wt ppm*1 | 1000 | 1000 | 0 | 1000 | 10000 |
| Polymerization temperature °C. | 140 | 130 | 140 | 100 | 60 |
| Final conversion wt %*2-1 | 80 | 80 | 80 | 80 | 80 |
| Weight average molecular weight (Mw) (× 10000) | 24 | 32 | 30 | 31 | 3.5 |
| Number average molecular weight (Mn) (× 10000) | 7 | 9 | 14 | 13 | 1.5 |
| Mw/Mn | 3.4 | 3.6 | 2.1 | 2.4 | 2.3 |

TABLE 2

|  | Example | | |
|---|---|---|---|
|  | 3 | 4 | 5 |
| Monomer Styrene % by weight | 100 | 100 | 100 |
| Compound (A)*1 | X1 | X2 | X3 |
| Concentration of compound wt ppm | 1000 | 1000 | 1000 |
| Polymerization temperature °C. | 120 | 120 | 120 |
| Final conversion % by weight*2-1 | 80 | 80 | 80 |
| Weight average molecular weight (Mw) (× 10000) | 32 | 34 | 27 |
| Number average molecular weight (Mn) (× 10000) | 11 | 12 | 7 |
| Mw/Mn | 2.9 | 2.8 | 3.9 |

TABLE 3

|  | Example 6 | Comparative Example 4 |
|---|---|---|
| Compound X1 wt ppm*1 | 2000 | 0 |
| Organic peroxide wt ppm*3 |  |  |
| PO1 | 0 | 2100 |
| PO2 | 550 | 350 |
| Polymerization temperature/time (hr) |  |  |
| 100° C. | 7 | — |
| 135° C. | 1 | — |
| 90° C. | — | 6 |
| 140° C. | — | 1 |
| Final conversion wt %*2-2 | 99.7 | 99.8 |
| Weight average molecular weight (Mw) (× 10000) | 23 | 26 |
| Number average molecular weight (Mn) (× 10000) | 7 | 12 |
| Mw/Mn | 3.3 | 2.2 |

*1 Compound (A)

X1: tetraethylthiuram disulfide (Soxinol TET: manufactured by Sumitomo Chemical Company, Ltd.)

X2: Tetrabutylthiuram disulfide (Soxinol TBT: manufactured by Sumitomo Chemical Company, Ltd.)

X3: Dipentamethylenethiuram tetrasulfide (Soxinol TRA: manufactured by Sumitomo Chemical Company, Ltd.)

The value is ppm by weight based on the styrenic compound.

*2-1 Final conversion:

About 0.1 g of a polymerization mixture taken out from the polymerization vessel was weighed accurately, dried under vacuum for 1 hour at 80° C. and 2 at 150° and the ratio of the weight after drying to the weight before drying, represented by percentage was defined as final conversion.

*2-1 Final conversion:

0.5 Gram of the polystyrene beads obtained was weighed accurately, and was solved in 20 ml of dimethylformamide. And a solution as gaschromatography sample was prepared by adding 1 ml of trimethylbenzene as an internal reference to the polystyrene solution. The residual styrene concentration (percentage/beads) was measured with gaschromatography. The final conversion was determined by (100—the residual styrene concentration).

*3 The organic peroxide

PO1: Benzoyl peroxide

PO1: Tert-butyl peroxybenzoate

The value is ppm by weight based on the styrenic monomer.

As illustrated above, according to the present invention, the styrenic polymer having a wide-spread molecular weight distribution could be obtained by a simplified preparing method of one stage.

What is claimed is:

1. A process for producing a styrenic polymer having a wide molecular weight distribution, which comprises;

adding to a styrenic monomer or a styrenic monomer and a monomer copolymerizable with the styrenic monomer, based on the total monomer, 50 to 5000 ppm by weight of at least one compound (A) selected from the group consisting of compounds having a dithiocarbamate group, sulfide compounds having at least one of an aryl group, an arylalkyl group and a thiazole group, and polymerizing said monomer in the absence of a radical initiator at a temperature of 110° to 180° C. to a final conversion of 40% by weight or more, said polymerization being carried out by a suspension polymerization, a batchwise bulk polymerization or a continuous bulk polymerization using a plug flow type polymerization reactor, wherein the styrenic polymer is produced having a molecular weight distribution of 2.5 or greater.

2. A process for producing a styrenic polymer having a wide molecular weight distribution, which comprises;

adding to a styrenic monomer or a mixture of styrenic monomer and a monomer copolymerizable with the styrenic monomer, based on the total monomer, 50 to 5000 ppm by weight of at least one compound (A) selected from the group consisting of compounds having a dithiocarbamate group, sulfide compounds having at least one of an aryl group, an arylalkyl group and a thiazole group, based on the total monomer, and polymerizing the monomer in the presence of a radical initiator at a temperature of 90° to 160° C. to a final conversion of 40% by weight or more, said polymerization being carried out by a suspension polymerization, a batchwise bulk polymerization or a continuous bulk polymerization using a plug flow type polymerization reactor, wherein the styrenic polymer is produced having a molecular weight distribution of 2.5 or greater.

3. The process according to claim 1, wherein the compound (A) is a member selected from the group consisting of compounds represented by the formulae:

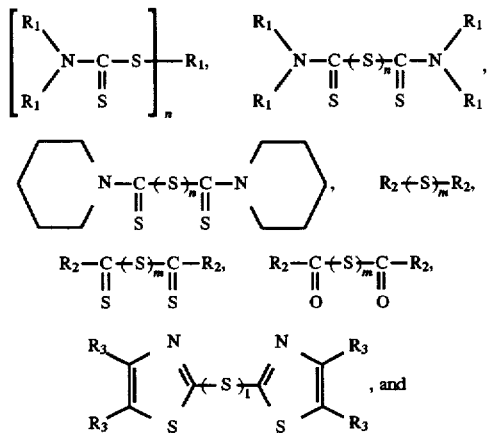

-continued

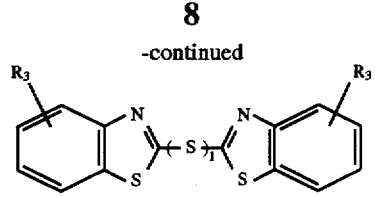

wherein $R_1$ represents an alkyl group having 1 to 4 carbon atoms or an aryl or arylalkyl group having 6 to 12 carbon atoms and may be the same or different in the same compound, $R_2$ represents an aryl or arylalkyl group having 6 to 12 carbon atoms and may be the same or different in the same compound, $R_3$ represents a hydrogen atom, an alkyl group having 1 to 4 carbon atoms, or an aryl or arylalkyl group having 6 to 12 carbon atoms and may be the same or different in the same compound, and each n, m and l represents an integer of 1 to 4.

4. The process according to claim 2, wherein the compound (A) is a member selected from the group consisting of compounds represented by the formulae:

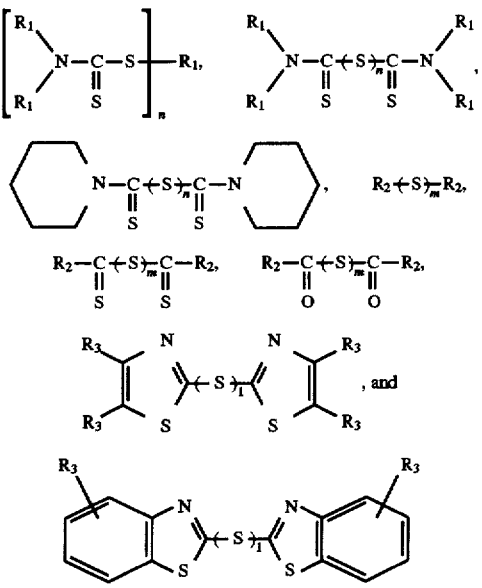

wherein $R_1$ represents an alkyl group having 1 to 4 carbon atoms or an aryl or arylalkyl group having 6 to 12 carbon atoms and may be the same or different in the same compound, $R_2$ represents an aryl or arylalkyl group having 6 to 12 carbon atoms and may be the same or different in the same compound, $R_3$ represents a hydrogen atom, an alkyl group having 1 to 4 carbon atoms, or an aryl or arylalkyl group having 6 to 12 carbon atoms and may be the same or different in the same compound, and each n, m and l represents an integer of 1 to 4.

5. The process according to claim 1, wherein an amount of the compound (A) is 50 to 4000 ppm by weight based on the total monomer.

6. The process according to claim 2, wherein an amount of the compound (A) is 50 to 4000 ppm by weight based on the total monomer.

7. The process according to claim 1, wherein the polymerization is carried out at a temperature of 120° to 160° C.

8. The process according to claim 2, wherein the polymerization is carried out at a temperature of 90° to 150° C.

9. The process according to claim 1, wherein the final conversion of polymerization is 60% by weight or more.

10. The process according to claim 2, wherein the final conversion of polymerization is 60% by weight or more.

11. The process according to claim 2, wherein the radical initiator is selected from the group consisting of organic peroxides and azo compounds.

12. The process according to claim 2, wherein the radical initiator is added in the amount of 50 to 5000 ppm by weight based on the total monomer.

13. The process according to claim 12, wherein the radical initiator is added in the amount of 100 to 5000 ppm by weight based on the total monomer.

14. The process according to claim 1, wherein the styrenic polymer is produced having a molecular weight distribution of 2.5 to 10.

15. The process according to claim 2, wherein the styrenic polymer is produced having a molecular weight distribution of 2.5 to 10.

* * * * *